United States Patent [19]

Kajio et al.

[11] 4,018,474
[45] Apr. 19, 1977

[54] VEHICLE BODY CONSTRUCTION WITH SLIMLY SHAPED FRONT PILLAR

[75] Inventors: Yoshihiro Kajio, Yokohama; Norimoto Aya, Yokosuka, both of Japan

[73] Assignee: Nissan Motor Co., Ltd., Yokohama, Japan

[22] Filed: Aug. 20, 1975

[21] Appl. No.: 606,213

[30] Foreign Application Priority Data

Aug. 29, 1974 Japan .............................. 49-98411

[52] U.S. Cl. .......................... 296/28 R; 296/84 R
[51] Int. Cl.² ............................................ B60J 1/00
[58] Field of Search ............ 296/28 R, 28 G, 28 H, 296/84 R

[56] References Cited

UNITED STATES PATENTS

| 2,061,788 | 11/1936 | Wright | 296/28 R |
|---|---|---|---|
| 2,456,175 | 12/1948 | Coppock | 296/28 R |

Primary Examiner—Philip Goodman

[57] ABSTRACT

The front pillar consists of three sheet-formed members, each of which is bent lengthwise to form a central crease, assembled back to back and in close contact with each other so that the three ridges of the respective creases form one line and the cross-section of the pillar is Y-shaped. The front pillar is arranged such that the front windshield and a window glass panel are mounted on the pillar partitioned by one leg of the letter Y, while the remaining side of the pillar is exposed to the interior of the body.

8 Claims, 16 Drawing Figures

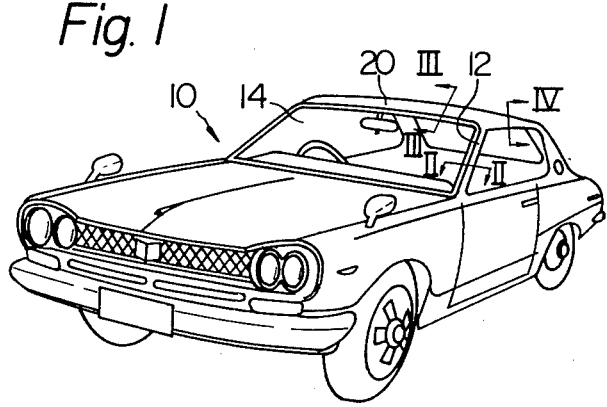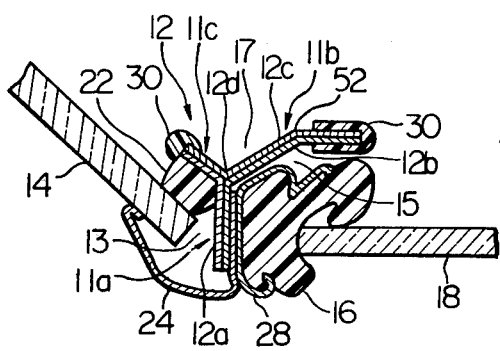

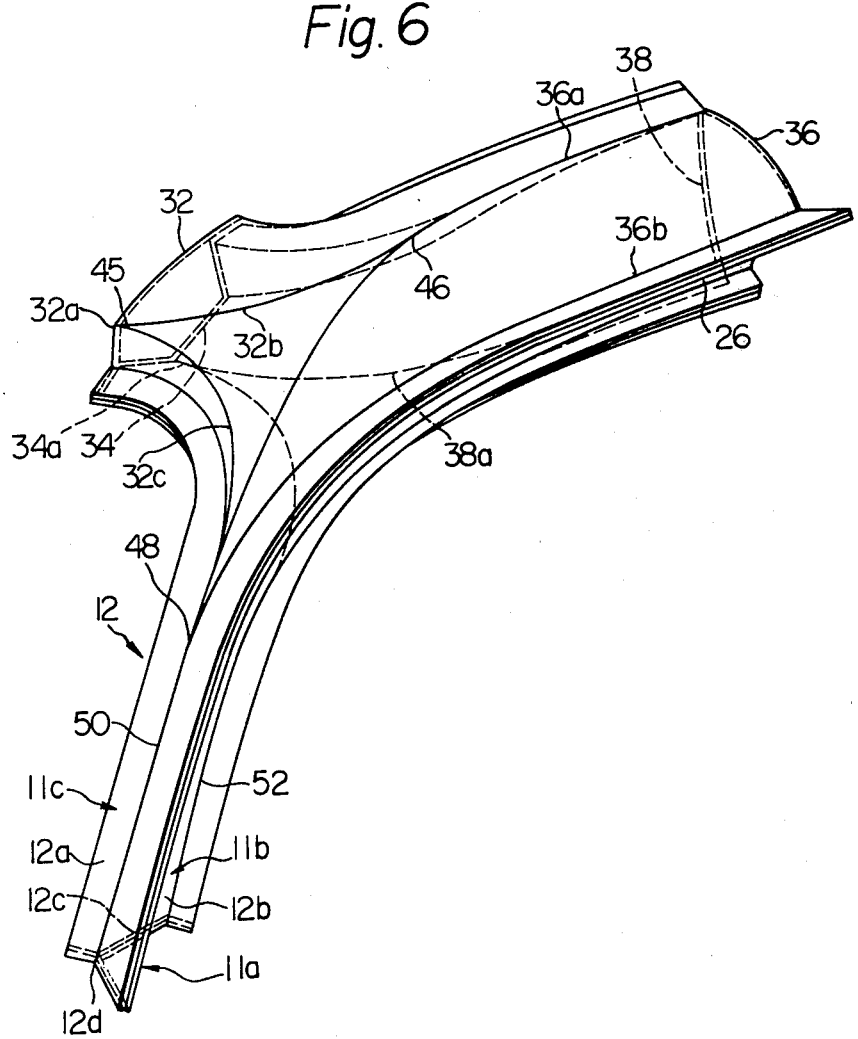

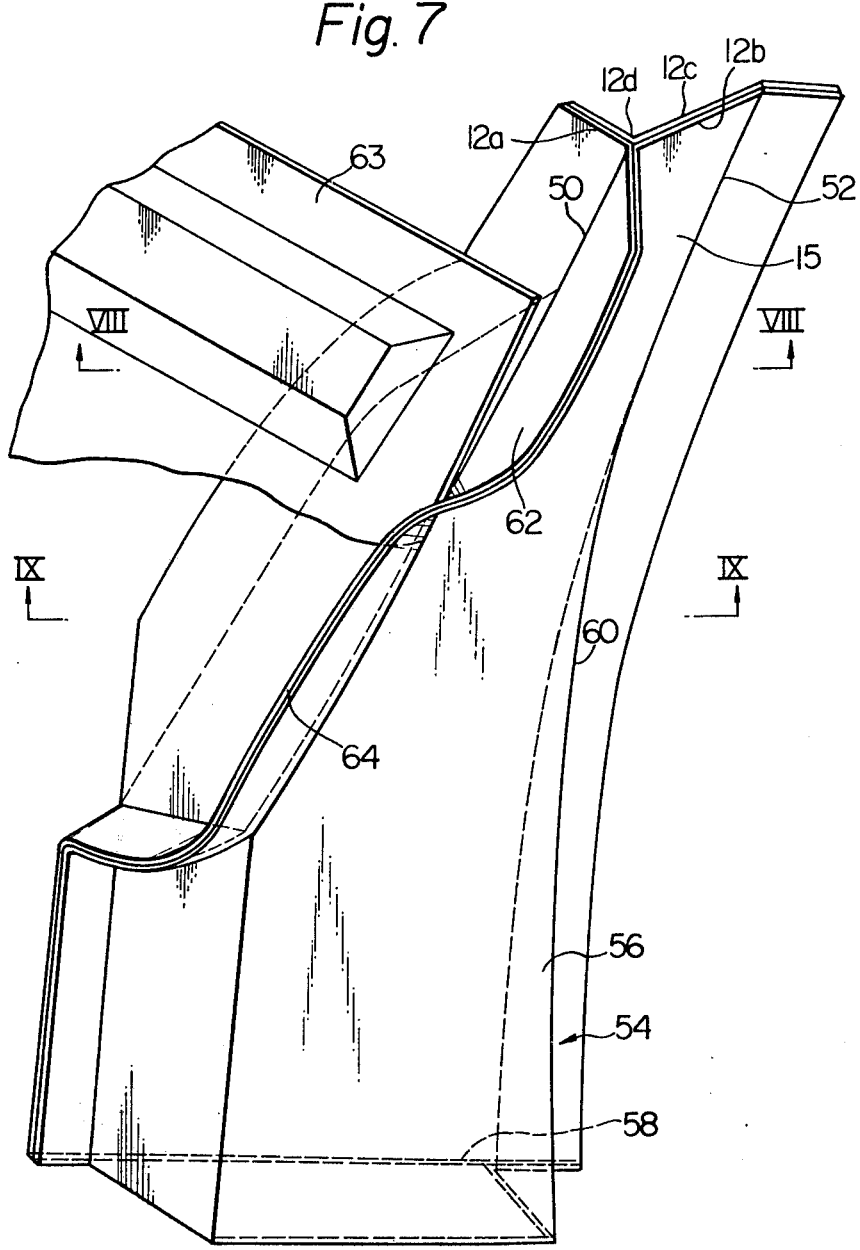

VEHICLE BODY CONSTRUCTION WITH SLIMLY SHAPED FRONT PILLAR

This invention relates generally to a vehicle body construction and more particularly to a body construction including a front pillar which has a uniquely shaped cross-section.

In modern automobile body constructions, there has been a general tendency to make front pillars as slim as possible both for the improvement of appearance and for safer driving derived from improved visibility. If a front pillar of satisfactory slimness is employed, however, difficulties are encountered in joining adjoining members with the pillar and/or mounting associated elements on the pillar. Besides, correlationships of the front pillar to the windshield, door window panels, door sashes and drip channels need thorough reconsideration when the front pillar is made slim beyond a certain limit. These difficulties and problems have not yet been solved satisfactorily by any of relatively slim front pillars proposed until now.

It is an object of the present invention to provide a vehicle body construction comprising a novel type of front pillar which is satisfactorily slim and shaped so as to permit easy and smooth joining with adjoining members of the body.

In a vehicle body construction according to the invention, a front pillar has a cross-section generally in the shape of the letter Y over a length substantially corresponding to the length of a side edge of a windshield and is arranged such that the windshield and a weatherstrip for a window glass panel are received in two different sides of the front pillar, respectively. while the remaining side is exposed to the interior of the body.

A front pillar according to the invention is preferably an integrated assembly of three sheets of metal strips, each of which is bent lengthwise to form a crease, formed by putting the three strips together back to back and in close contact with each other such that the ridges of the creases of the respective strips form one line, and lap joints are formed at lateral end regions of the strips. The thus constructed front pillar is locally deformed at its uppermost and lowermost regions to form a closed space therein so that the front pillar can be easily joined with and merge smoothly into adjoining box or channel-formed members.

Other features and advantages of the invention will become apparent from the following detailed description of preferred embodiments thereof with reference to the accompanying drawings, in which:

FIG. 1 is a perspective view of an automobile which employs a body construction according to the invention;

FIG. 2 is a sectional view taken along the line II—II of FIG. 1 and shows the shape and arrangement of a front pillar according to the invention;

FIGS. 3 and 4 are sectional views taken along the lines III—III and IV—IV of FIG. 1, respectively;

FIG. 5 is a cross-sectional view of a fundamentally similar but slightly modified front pillar;

FIG. 6 is a perspective view of a portion of an automobile body including an upper portion of the front pillar of FIG. 2;

FIG. 7 is a perspective view of another portion of the same body including a lower portion of the same front pillar;

Figure 10:
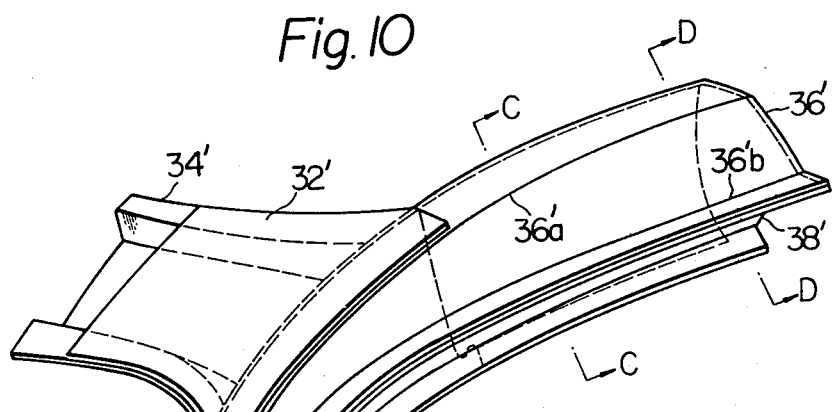
FIG. 10 is a perspective view of a portion of an automobile body including a front pillar which is different in the cross-sectional shape at an upper portion from the pillar of FIGS. 6–9.

Referring at first to FIGS. 1 to 4, an automobile body 10 includes a front pillar 12 on each side, inclined somewhat inwardly and to the rear. As an essential feature of the invention, the front pillar 12 has a Y-shaped cross-section as seen in FIG. 2 substantially throughout its major portion laterally adjacent a windshield 14. Accordingly this front pillar 12 has three major surfaces each of which is bent lengthwise and extends over two wall members or "legs" of the letter Y. These three surfaces are assigned different services and define three sections or sides about the central portion of the Y-shape. The windshield 14 is attached to or mounted on a first side indicated at 13, and a weatherstrip 16 for the front end of a window glass panel 18 is supported by another side 15 of the pillar 12. The remaining side 17 of the pillar 12 is assigned no particular function but exposed to the interior of the body 10 or passenger compartment of the car. In FIGS. 2 to 4, the windshield 14 is attached both to the first side 13 of the pillar 12 and a roof panel 20 by the use of an adhesive layer or a sealant 22 and the lateral edge of the windshield 14 is enclosed in a molding 24. Clearances between the window glass panel 18 and the second side 15 and a panel 26 of a side rail assembly for supporting the roof panel 20 thereon are sealed by the weatherstrip 16 which is held in position by a retainer 28. The two lateral edges of the third side 17 are covered with moldings 30 of an elastomeric material, respectively. The roof panel 20 is supported by a box-like front rail assembly formed of an upper panel 32 and a lower panel 34 and a side rail assembly formed of an upper panel 36, the outer and lower panel 26 and an inner and lower panel 38.

The cross-sectionally Y-shaped front pillar 12 is extremely thin or slim in its lateral dimensions since the width is determined substantially by the thickness of a wall 11a, i.e., one of the "legs" of the letter Y, partitioning the first side 13 from the second side 15. Nevertheless, the Y-shaped construction affords sufficient strength to this front pillar 12. The front pillar 12 provides improved visibility to the driver due to its slimness. Besides, this pillar 12 is almost invisible from the outside of the car, so that the body 10 has an elegant appearance and gives an impression as if the windshield 14 leads directly to the side window panel 18, and the passenger compartment seems wider than its actual dimensions. Furthermore, the employment of this front pillar 12 brings about a noticeable reduction in the hissing and whistling sound produced during driving at high speeds because of a shortened lateral distance between the side edge of the windshield 14 and the window glass panel 18.

The Y-shaped front pillar 12 is preferably an assembly of three sheets of generally rectangular metal strips 12a, 12b and 12c each of which is bent lengthwise to form a crease as illustrated in FIG. 2. A slimest pillar 12 is formed when the three sheets or plates 12a, 12b and 12c are put together back to back such that each plate is in full contact with the other two plates and that the ridges of the creases formed by the bending of the respective plates 12a, 12b and 12c are aligned with each other in a longitudinal line which corresponds to the center 12d of the letter Y. The objects of the invention can be accomplished, however, even when the cross-sectional shape of the front pillar includes a narrow and closed plane figure located around the center 12d of the letter Y in FIG. 2. In a modification shown in FIG. 5, the three plates 12a, 12b and 12c are bent respectively and assembled together so as to form and enclose a closed space 40 which is triangular in cross-section. The dimensions of the space 40 are made as small as possible compared with the lengths of the three "legs" 42a, 42b and 42c of the letter Y. The provision of the space 40 can facilitate the practical fabrication of the front pillar 12. In both the cases of FIG. 2 and FIG. 5, joining of each plate 12a, 12b or 12c with the other two plates may be accomplished over either the entire areas of the lapped regions or only lateral end regions as indicated at 44a, 44b and 44c in FIG. 5. Any of the three legs, 11a, 11b, 11c in FIG. 2 or 42a, 42b, 42c in FIG. 5 may be bent laterally at a certain distance from the extending end of the leg, as seen at 11b in FIG. 2 and 44b in FIG. 5, according to the shape of any of the associated elements such as the weatherstrip 16.

The improvements in visibility and appearance are accomplished by shaping the front pillar 12 in the above described fashion over a length substantially corresponding to the height of, or the length of the lateral end of the windshield 14. The remaining upper and lower sections of the front pillar 12 can be deformed to have differently shaped cross-sections, respectively, to offer best advantages in joining the front pillar 12 with adjoining members of the body 10. An example of variations in the cross-sectional shapes of the pillar 12 at its upper and lower end sections will be explained hereinafter referring to FIGS. 6 to 9.

In FIG. 6, the front pillar 12 of FIG. 2 is joined with the front and side rail assemblies shown in FIGS. 3 and 4. In this upper body construction, the upper panel 32 of the front rail assembly is bent to form a crease or ridge 32a, and this ridge 32a divides into two branches, one 32b running longitudinally of the body 10 and the other 32a downward, at a point 45 close to the upper and left end of the windshield 14. The horizontal ridge 32b is curved and merges into a longitudinally running ridge 36a along which meet the upper panel 36 and the inner lower panel 38 of the side rail assembly at a point 46. The downward ridge 32c merges into a line 50 along which the first plate 12a of the front pillar 12 is bent lengthwise at a point 48. This line 50 corresponds approximately to the center 12d of the letter Y in the cross section of the pillar 12. The lower panel 34 of the front rail assembly forms a lateral crease 34a, and the lateral end portion of the panel 34 is curved such that the crease 34a merges into a crease 38a of the inner lower panel 38 of the side rail assembly. The second and third plates 12b and 12c which are arranged in close contact with each other are bent together along a longitudinal line 52 at a distance from the center 12d of the letter Y. The front pillar 12 is cleaved along the central line 50 at an uppermost section above the point 48, and the two legs 11b and 11c of the letter Y forming the side 15 are bent such that the line 52 merges into a ridge 36b along which meet the upper panel 36 and the outer lower panel 26 of the side rail assembly.

FIG. 7 shows a manner of deformation of the front pillar 12 at its lower section to give a lower boxlike column 54 which is formed of an outer channel panel 56 and an inner panel 58. The side 15 of the pillar 12 is gradually widened as it runs downwards at a region between the central crease 50 and the other crease 52, and the plate 12c forming the side 17 exposed to the passenger compartment is gradually separated from the second plate 12b as shown crosssectionally in FIG. 8. At a still lower section, the second plate 12b is bent lengthwise and outwards to form another crease 60 between the creases 50 and 52. As the result of local separation of the second plate 12b from the third plate 12c and bending along the line 60, the lower section of the front pillar 12 forms a closed space 40a which is defined by the three plates 12a, 12b and 12c and has a quadrilateral shape in cross-section as seen in FIG. 9. Consequently, the second plate 12b merges gently into the channel panel 56 of the column 54.

Figure 8:
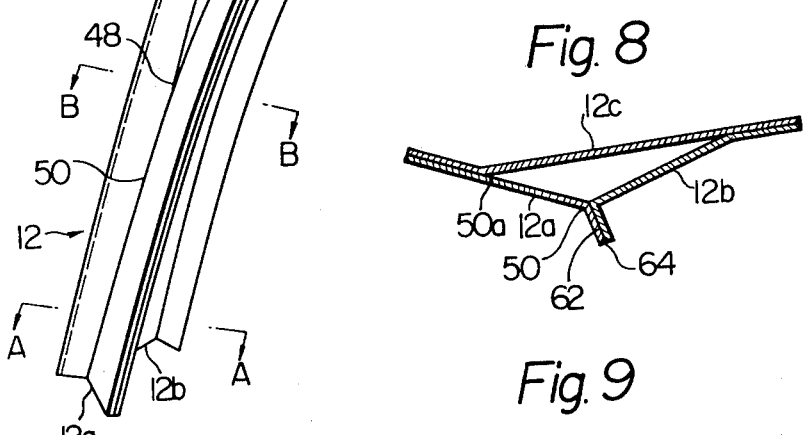
FIGS. 8 and 9 are sectional views of the same front pillar taken along the lines VIII—VIII and IX—IX of FIG. 7, respectively.
Figure 9:
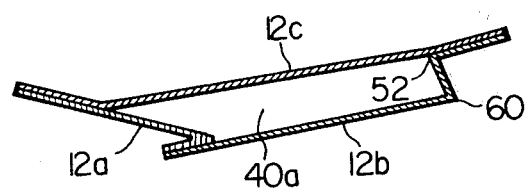
Figure 11A:
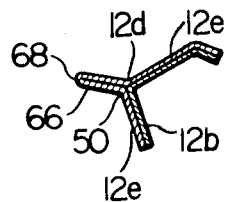
FIG. 11 shows variations in the cross-sectional shapes of the front pillar and an adjoining member when taken along the lines A—A, B—B, C—C and D—D of FIG. 10, respectively.
Figure 11B:
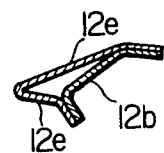
Figure 11C:
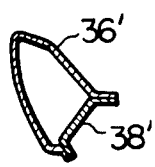
Figure 11D:
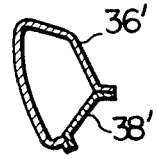

The first plate 12a also is widened at its lower section and partly separated from the third plate 12c as seen in FIG. 8, and a dashboard 63 is attached to the first plate 12a at the widened region. The third plate 12c is widened at its lower portion and merges into the inner panel 58 of the column 54. The first plate 12a is still joined with the second plate 12b in a long flange region 62 bordered by the central crease 50 and an edge 64. In joining the front pillar 12 with the lower column 54, the central crease 50 is left straight, but the edge 62 is approximately S shaped. Accordingly the flange 62 is twisted and the mergence of the pillar 12 into the boxlike column 54 is smoothed by the aid of the twisted flange 62 as seen in FIG. 7.

FIGS. 10 and 11 show another example of variations in the cross-sectional shapes of the pillar 12 at its upper section. The front pillar 12 has fundamentally the same cross-sectional shape as in the case of FIG. 2, but consists of only two plates. One of these plates is the same as the second plate 12b in FIG. 2, and another single plate 12e replaces the first and third plates 12a and 12c of FIG. 2. As seen at (a) in FIG. 11, the plate 12e is in contact with the second plate 12b but has an intermediate flange 66 which serves as one of the three legs of the letter Y. The flange 66 is formed by folding the plate 12e along the line 50, folding it back along another line 68 and once more folding it where it contacts the line 50. The wider panel 12e is joined with the second plate 12b only at the lateral end regions, so that a major part of the plate 12e forming the third side 17 can be spaced from both the remaining part and the second plate 12b at least at upper and lower end sections of the pillar 12. An upper body construction shown in FIG. 10 is fundamentally similar to the upper body construction of FIG. 6 and includes a front rail assembly made up of an upper panel 32' and a lower panel 34' and a side rail assembly made up of an upper panel 36' and a lower panel 38'. The central line 50 of the pillar 12 divides into two branches at the point 48 and merges into a crease 36a' and a line 36b' along which meet the upper and lower panels 36' and 38' of the side rail assembly. A major part of the wider plate 12e of the pillar 12 is separated from the other side of the flange 66 and the second plate 12b at an upper section above the point 48 to form a closed space 40b as shown at (b) in FIG. 11, and the separated part is gradually windened and deformed as its extends upwards and rearwards. The front pillar 12, therefore, merges gently and smoothly into the side rail assembly, the cross-sectional shape of which varies gradually as shown at (c) and (d) in FIG. 11.

Such deformation as shown in FIGS. 10 and 11 can be accomplished by forming any of the three legs of the letter Y in the shape of an intermediate flange obtained by folding back a single plate according to the shape and arrangement of external members with which the front pillar 2 is to be joined. At (a) in FIG. 12, a leg or wall 70 partitioning the second side 15 from the third side 17 is formed to have a seamless edge 68. At (b), the same is applied to another wall 72 partitioning the first and second sides 13 and 15.

Figure 12A:
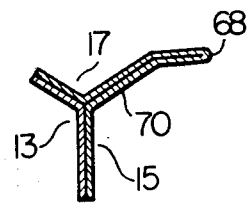
FIG. 12 shows cross-sections of two front pillars which are similarly shaped to the pillar of FIG. 11 but slightly differently constructed, respectively.
Figure 12B:
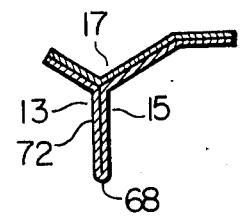

The construction of the pillar 12 as shown in FIGS. 11 and 12 has an additional advantage that the manufacture of the pillar 12 is facilitated since the reduction in the number of the wall members, i.e., three to two, results in less chance of discrepancy in relative positions of the wall members.

As seen from the foregoing description, the front pillar 12 according to the invention has the advantages, in addition to the previously described ones, that the front pillar 12 can be joined with adjoining members of the vehicle body 10 easily and smoothly without need of particular skill in the assembling works. Besides, the structural strength of the body 10 can be increased since the assemblying or joining works with respect to the front pillar 12 are accomplished without causing extraordinary distortions of related members and/or using unnecessary numbers of joint members.

What is claimed is:

1. A vehicle body construction comprising a windshield, a window glass panel and a front pillar consisting of three wall members assembled together to form a substantially central core portion having a minimized cross-sectional area and being substantially hollowless, by joining one another at an edge region of each wall member and extend from said core portion each at angles with the other two wall members such that said front pillar has a cross-section generally in the shape of the letter Y over a length substantially corresponding to the length of a lateral edge of said windshield, said front pillar being arranged such that said windshield being received in a first one of three sides of said front pillar, a weather strip for a front edge of a window glass panel being received in a second side of said front pillar, the third side of said front pillar being exposed to the interior of the body.

2. A vehicle body construction comprising a windshield, a window glass panel and a front pillar having a cross-section generally in the shape of the letter Y over a length substantially corresponding to the length of a lateral edge of said windshield, said front pillar being arranged such that said windshield being received in a first one of three sides of said front pillar, a weather strip for a front edge of a window glass panel being received in a second side of said front pillar, the third side of said front pillar being exposed to the interior of the body, wherein said front pillar is an assembly of three rectangular sheet-formed members, each of said three members being bent lengthwise to form a crease, said three members being put together back to back and in close contact with each other, the ridges of three creases respectively formed in said three members forming one line, each of said three members being joined with the remaining two members at lateral end regions.

3. A vehicle body construction as claimed in claim 2, wherein one of three legs of the letter Y serving as the boundary between said second and third sides is bent lengthwise again at a distance from the extended end thereof such that the bent portion is generally parallel to said window glass panel.

4. A vehicle body construction as claimed in claim 3, further comprising a roof panel and at least one box-like member supporting said roof panel thereon, said front pillar being cleft at an uppermost section along said crease in said first side and curved such that one ridge of said box-like members merges into said crease in said first side while another eidge of the same box-like member merges into the curved cleft.

5. A vehicle body construction as claimed in claim 4, wherein a lower section of said front pillar is formed to form a box-like column, one of said three sheet-formed members being deformed at a lowermost section of said front pillar such that the deformed member gradually loses said crease thereof and is gradually and locally spaced from the remaining two sheet-formed members with shortening distances to the lower end of said front pillar, at least one of said three sheet-formed members being gradually varied in the width thereof and deformed with shortening distances to the lower end of said front pillar such that said front pillar merges into said box-like column.

6. A vehicle body construction as claimed in claim 5, wherein said front pillar is deformed at said lowermost section such that one of the three legs of said letter Y serving as the boundary between said first and second sides is twisted thereby to permit said lowermost section to merge smoothly into said box-like column.

7. A vehicle body construction comprising a windshield, a window glass panel and a front pillar having a cross-section generally in the shape of the letter Y over a length substantially corresponding to the length of a lateral edge of said windshield, said front pillar being arranged such that said windshield being received in a first one of three sides of said front pillar, a weather strip for a front edge of a window glass panel being received in a second side of said front pillar, the third side of said front pillar being exposed to the interior of the body, wherein said front pillar is an assembly of two rectangular sheet-formed members of different widths put together back to back and in close contact with each other, each of said two members being bent lengthwise to form a first crease, the wider member being folded back along a line distant from said crease and again bent lengthwise to form a second crease overlapping said first crease thereof, the ridges of the two creases of said wider member and the single crease of the other member coinciding with each other, said other member being joined with said wider member at least at lateral end regions.

8. A vehicle body construction as claimed in claim 7, further comprising a roof panel and at least one box-like member supporting said roof panel thereon, said front pillar being deformed at an uppermost section thereof such that said second crease of said wider member is gradually spaced from said first crease thereby to form a closed space in said front pillar with shortening distances to the upper end of said front pillar, said wider member being gradually deformed and varied in width with shortening distances to the upper end of said front pillar such that said front pillar merges into said box-like member.

* * * * *